United States Patent [19]

Gagneraud

[11] 4,348,340

[45] Sep. 7, 1982

[54] PRODUCTION OF SPHEROIDAL GRANULES FROM MOLTEN INORGANIC MATERIALS

[76] Inventor: Francis Gagneraud, Villa Montmorency, 6 Allee des Tilleuls, 75016 Paris, France

[21] Appl. No.: 175,892

[22] Filed: Aug. 6, 1980

[30] Foreign Application Priority Data

May 20, 1980 [FR] France ................. 80 11199

[51] Int. Cl.³ .................................. B01J 2/02
[52] U.S. Cl. ...................................... 264/8
[58] Field of Search ............................ 264/8

[56] References Cited

U.S. PATENT DOCUMENTS

| | | | |
|---|---|---|---|
| 1,047,370 | 12/1912 | Bergquist | 65/19 |
| 1,471,421 | 10/1923 | Sem | 65/20 |
| 1,924,728 | 8/1933 | Sem | 65/20 |
| 2,520,168 | 8/1950 | Powell | 65/15 |
| 3,594,142 | 7/1971 | Morgesson et al. | 65/19 |
| 3,709,670 | 1/1973 | Eriksen | 65/8 |
| 4,115,089 | 9/1978 | Metz et al. | 264/8 |
| 4,215,084 | 7/1980 | Maringer | 264/8 |
| 4,256,677 | 3/1981 | Lee | 264/8 |

FOREIGN PATENT DOCUMENTS 1514379  6/1978  United Kingdom .

*Primary Examiner*—James R. Hall
*Attorney, Agent, or Firm*—Browdy & Neimark

[57] ABSTRACT

Spheroidal granules or balls are prepared from molten metallurgical slags and scorias by pouring the molten material onto an uncooled rotary cylinder, after possible passage on an inclined feed plate or table, without any cooling being assured by liquid or gaseous means other than the ambient atmosphere between pouring of the material and the reception area where hard spherical granules pile up and can be sorted by screening. The spheroidal granules can be formed from all types of slags, especially basic, phosphated or not, steel mill slags.

3 Claims, No Drawings

PRODUCTION OF SPHEROIDAL GRANULES FROM MOLTEN INORGANIC MATERIALS

FIELD OF THE INVENTION

This invention relates to the field of treating molten inorganic materials and metals and relates to a process for obtaining granules of a high sphericity index, particularly balls, from molten inorganic products such as molten silicates, metals and alloys in the liquid state, molten glasses and clinkers, and especially metallurgical slags such as blast-furnace and steel mill slags, phosphated or not, molten scorias, etc.

BACKGROUND OF THE INVENTION

It is known that a certain number of inorganic materials, in particular unphosphated steel mill slags, the term "slag" also including scorias, represent very great quantities of residues of which only a slight part is used. Treatments performed so far on these residues make it possible to obtain products whose usage value is relatively slight, for example, granulates for making fill and layers of roads, and for soil improvement products.

In processes intended to obtain products of a small granulometry from molten materials such as slags, generally a dispersion of the material is fed onto a suitably cooled winged drum and a relatively intense cooling of the molten mass is assured by sprinkling water and/or jets of cold air thereon. The granulates of solidified slags have a porous, expanded structure, in particular when porophoric agents are incorporated in the molten mass.

When it is desired to obtain hard, non-porous products of compact structure, or, for example, blasting sands of great usage value, from the molten slags, it is necessary to crush and grind the materials recovered in the cooling pit. However, these operations consume a considerable amount of energy and cause an excessive wear of the equipment used because of the extreme abrasiveness of the materials.

SUMMARY OF THE INVENTION

It has now been found, as a result of industrial tests, that it is possible to obtain directly from molten inorganic materials, without the need of further crushing or grinding, very hard spherical products, similar to balls, whose diameters can go down to a very fine and narrow granulometry bracket.

According to the new process of the present invention, the molten mass is poured into a rotary device without any special cooling by liquid or gaseous means other than the ambient atmosphere, between the pouring of material and the receiving area where the materials pile up after disintegration by the rotary device and projection through the atmosphere.

It has thus been found that by operating without addition of any cooling agent, either at the pouring path of the molten mass or at the rotary system, and provided a minimum speed is maintained for the latter, there is obtained in the pit or on the receiving area a product made up almost exclusively of very hard balls or spheroidal elements offering wide possibilities of use.

DETAILED DESCRIPTION OF EMBODIMENTS

The rotary system is made of materials to resist an elevation of temperature. In practice a device turns on a horizontal axis. This device can be solid or hollow, with a thick wall or a hollow wall. If it is in the shape of a polygon, the edges serve to cut the molten material; in case a solid or hollow cylindrical body is used, it should be provided with a plurality of paddles or blades that can vary from 2 to 16 depending on needs (French Pat. Nos. 80.08368 and 80.08477 of Apr. 15 and 16, 1980).

When the rotary system is a hollow body, it is advantageously made up of two flanges on which rest thick blades whose number can also vary. In each case, the ends of the edges, paddles or blades describe cylindrical surfaces of revolution whose diameter can vary, for example, from 150 to 800 mm.

By suitably selecting the characteristics of the revolving body, e.g. length, diameter or surface of revolution, number of blades or cutting elements, rotating speed, etc., it is possible to obtain spheroidal granules whose dimensions range from 0.1 to 5 mm, or at times up to 10 mm. When it is desired to produce spheroidal granules of a diameter below 5 mm, the peripheral speed of the blades or cutting elements should not go below 10 meters/second. The number of passages of blades per second past a fixed point, for example the end of a feed plate if one is used, should be a minimum of 40.

In practice, the molten material is poured directly from its pouring ladle, evacuation runner or an intermediate tank for overflow onto the body revolving at high speed. According to a variant, the stream of molten material is sent on an inclined plane or feed table of the sheet plate type that is very thick, in a way known in itself, without assuring cooling by circulation of water, before flowing onto the rotary system. Thus, it is possible to control the width and thickness of the sheet of material arriving on the revolving body.

By way of non-limiting example, an LD* steel mill slag, still comprising liquid steel in suspension, was treated by flowing the molten slag over an uncooled feed plate and then to a solid cylinder equipped with 12 blades and turning at a speed of 900 rpm, at a delivery rate of 10 to 60 metric tons per meter of length of the rotary system. The ends of the blades described a cylindrical surface of revolution of 600 mm in diameter. The peripheral speed of the blade ends was 28.3 m/second and the frequency of passage of the blades in front of the end of the table was 180 times per second.

*The LD process is a well-known oxygen steel making process.

The molten LD slag contained undecanted liquid metal in suspension. There was obtained in the receiving area, after disintegration of the material into droplets by the rotary system and projection of the droplets into and through the ambient atmosphere, a material made up for the most part of spheroidal granules not exceeding 5 mm; the granules exhibiting the greatest sphericity index had a diameter less than 3 mm; there were no granules with a diameter below 0.1 mm.

Metallic particles and particles rich in ferromagnetic oxide were extracted by simple magnetic separation.

The nonmagnetic granules, made up solely of slag, had the appearance of compact balls with a nitrified aspect on the surface, with great resistance to impacts and crushing; their microhardness index was between 600 and 1000 Vickers or between 6 and 7 on the Mohs scale. By screening it was possible to obtain very close granulometric ranges such as 0.1 to 0.25 mm; 0.25 to 0.50 mm; 0.50 to 1 mm; 1 to 2 mm; 2 to 3 mm, etc.

During the use of the process, it was noted that there was no formation of powders nor, moreover, the production of steam because there was no injection of cooling water to the mass of molten material.

The products obtained by the process of the present invention exhibit interesting physical and chemical characteristics. In particular, in the case of slags, the granules are very compact because no expanding agent, e.g. steam, has been used. The density of the granules is between 3000 and 3500 kg/m$^3$ depending on the granulometric ranges the density of the material being slightly greater than 3500 kg/m$^3$. In the case of metallic granules, the density is greater because they are made up of tempered metal exhibiting a microhardness that exceeds that of slag granules. The resulting granules have a vitrified surface and do not come apart, even after immersion in water. The stability of the granules was due to rapid cooling of the material.

The fields of application of these spheroidal granules are very varied. Regardless of their composition (metal or slag base) the granules with a slight sphericity index can be used as surface blasting products. Granules with a high sphericity index can be used in peening operation or surface preparation by hammering. Slag base granules advantageously replace spherular glass in making heat accumulators or solar energy collectors because of their great resistance to crushing, e.g. 200 to 1000 megapascals depending on the granulometric range. They can be used in making microconcretes and refractory materials; and they can be incorporated in high-resistance concretes whose surfaces, subjected to wear, must remain smooth, such as those used for spillways and tail races the surfaces of which must remain smooth.

Moreover, the products made by the process of the present invention can be recycled into the slag agglomeration line of the steel-making process, not shown, or again be used as slow acting fertilizer when phosphate slags are involved.

Although shown in the above example for treating metallurgical slags, the above process applies to all molten metals and alloys and to molten inorganic materials such as minerals, glasses, ceramics, molten cement clinker and particularly to products of medium and strong basicity.

It will be obvious to those skilled in the art that various changes may be made without departing from the scope of the invention and the invention is not to be considered limited to what is described in the specification.

What is claimed is:

1. A process for producing spheroidal granules with a high sphericity index from molten material consisting essentially of metallurgical slag or scoria, comprising:
   (a) pouring the molten material directly onto an uncooled polygonal rotating device having edge or onto an uncooled cylindrical rotating device equipped with paddles or blades, the peripheral speed of said edges or said paddles or blades being at least 10 meters/second with a sufficient number of said edges or said paddles or blades being present to provide at least 40 passages of said edges or said paddles or blades past a fixed point per second, such that the molten material being poured onto said rotating device is disintegrated into small molten droplets and projected into the ambient atmosphere, said droplets solidifying in the ambient atmosphere into spheroidal granules consisting substantially of granules having a diameter between 0.1 and 5 mm and a hardness index at least equal to 6 (Mohs scale), no gaseous or liquid cooling means, other than the ambient atmosphere, being provided to the molten material during said step (a); and
   (b) recovering the formed spheroidal granules.

2. A process in accordance with claim 1 wherein said rotary device is hollow and includes two flanges on which rest blades having ends which describe a cylindrical surface of revolution of a diameter of 150 to 800 mm.

3. Spheroidal granules of metallurgical slag or scoria obtained by the process of claim 1, said granules having a hardness index of at least equal to 6 (Mohs scale) and consisting substantially of granules having a diameter between 0.1 and 5 mm.

* * * * *